US011433655B2

(12) United States Patent
Yoo et al.

(10) Patent No.: US 11,433,655 B2
(45) Date of Patent: Sep. 6, 2022

(54) DISPLAY DEVICE MANUFACTURING APPARATUS AND DISPLAY DEVICE MANUFACTURING METHOD USING THE SAME

(71) Applicant: Samsung Display Co., LTD., Yongin-si (KR)

(72) Inventors: Jae Suk Yoo, Seoul (KR); Young Su Kim, Gunpo-si (KR); Sang Won Lee, Seoul (KR); Kyu Ho Jung, Osan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 20 days.

(21) Appl. No.: 17/082,776

(22) Filed: Oct. 28, 2020

(65) Prior Publication Data
US 2021/0291507 A1 Sep. 23, 2021

(30) Foreign Application Priority Data
Mar. 18, 2020 (KR) ........................ 10-2020-0033171

(51) Int. Cl.
*B32B 37/10* (2006.01)
*B32B 3/04* (2006.01)

(52) U.S. Cl.
CPC ................ *B32B 37/10* (2013.01); *B32B 3/04* (2013.01); *B32B 2037/1063* (2013.01); *B32B 2457/20* (2013.01)

(58) Field of Classification Search
CPC ...................... B32B 37/10; B32B 3/04; B32B 2037/1063; B32B 2457/20; B32B 2307/202;
(Continued)

(56) References Cited

U.S. PATENT DOCUMENTS 9,337,433 B2 * 5/2016 Lim ........................ H01L 51/56
9,379,355 B1 * 6/2016 Lee ..................... H01L 51/5237
(Continued)

FOREIGN PATENT DOCUMENTS

DE 202019002814 U1 * 8/2019
JP 2016-211618 12/2016
(Continued)

OTHER PUBLICATIONS

StewMac—https://www.stewmac.com/luthier-tools-and-supplies/types-of-tools/saws/stewmac-fret-slotting-miter-box/?utm_source=google&utm_medium=shopping&utm_campaign=2022-02-gp&gclid=EAIaIQobChMImd-X3aej9glVDFNyCh0pFwThEAQYBSABEgKyOPD_BwE#productDescription (Year: 2012).*
DE202019002814U1 Machine Translation (Year: 2019).*

*Primary Examiner* — Francisco W Tschen
*Assistant Examiner* — Abhishek A Patwardhan
(74) *Attorney, Agent, or Firm* — Kile Park Reed & Houtteman PLLC

(57) ABSTRACT

A display device manufacturing apparatus includes a support portion including a core portion and a conductive portion disposed over the core portion. The core portion includes a first flat surface extending in a first direction; a second flat surface extending in the first direction and being opposite to the first flat surface; and a curved surface extending between the first flat surface and the second flat surface. The conductive portion includes a first flat conductive portion overlapping the first flat surface of the core portion in a second direction; a second flat conductive portion overlapping the second flat surface of the core portion in the second direction; and a curved conductive portion extending between the first flat conductive portion and the second flat conductive portion.

13 Claims, 13 Drawing Sheets

(58) Field of Classification Search
CPC .......... B32B 2307/208; B32B 2307/51; B32B 2307/536; B32B 2307/546; B32B 2307/7244; B32B 7/022; B32B 15/043; B32B 15/06; B32B 15/20; Y02E 10/549; H01L 51/56; H01L 27/32; H01L 51/0097; B29C 63/0043; B29C 65/008; B29C 65/785; B29C 65/7852; B29C 66/81421; B29C 66/81422; B29C 66/81423
USPC ...................................................... 156/306.3
See application file for complete search history.

(56) References Cited

U.S. PATENT DOCUMENTS

| | | | |
|---|---|---|---|
| 9,857,845 B2* | 1/2018 | Hong | G06F 3/0445 |
| 9,865,670 B2* | 1/2018 | Park | H01L 51/0097 |
| 2014/0002385 A1* | 1/2014 | Ka | G06F 1/1652 |
| | | | 345/173 |
| 2017/0069879 A1* | 3/2017 | Um | H01L 51/56 |

FOREIGN PATENT DOCUMENTS

| | | |
|---|---|---|
| JP | 2018-21769 | 2/2018 |
| KR | 10-1684390 | 12/2016 |
| KR | 10-1701247 | 2/2017 |
| KR | 10-2018-0099089 | 9/2018 |
| KR | 10-1947164 | 2/2019 |

* cited by examiner

FIG.3

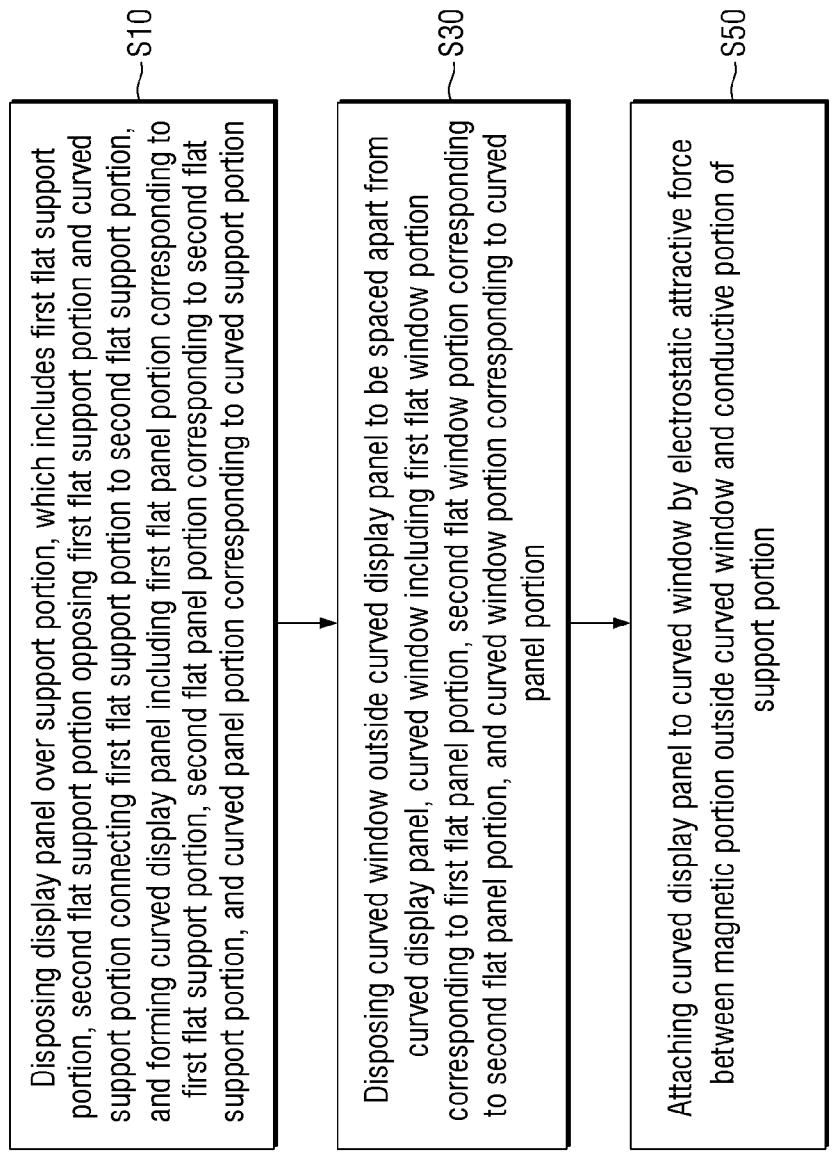

S10: Disposing display panel over support portion, which includes first flat support portion, second flat support portion opposing first flat support portion and curved support portion connecting first flat support portion to second flat support portion, and forming curved display panel including first flat panel portion corresponding to first flat support portion, second flat panel portion corresponding to second flat support portion, and curved panel portion corresponding to curved support portion S30: Disposing curved window outside curved display panel to be spaced apart from curved display panel, curved window including first flat window portion corresponding to first flat panel portion, second flat window portion corresponding to second flat panel portion, and curved window portion corresponding to curved panel portion S50: Attaching curved display panel to curved window by electrostatic attractive force between magnetic portion outside curved window and conductive portion of support portion

DISPLAY DEVICE MANUFACTURING APPARATUS AND DISPLAY DEVICE MANUFACTURING METHOD USING THE SAME

CROSS-REFERENCE TO RELATED APPLICATION(S)

This application claims priority to and benefits of Korean Patent Application No. 10-2020-0033171 under 35 U.S.C. § 119, filed on Mar. 18, 2020 in the Korean Intellectual Property Office, the entire contents of which are incorporated herein by reference.

BACKGROUND

1. Technical Field

The disclosure relates to a display device manufacturing apparatus and a display device manufacturing method using the same.

2. Description of the Related Art

Electronic apparatuses providing images to users, such as a smartphone, a tablet PC, a digital camera, a laptop computer, a navigation device and a smart television, may include display devices that may display images. The display device may include a display panel that may generate and display an image and various input devices.

Among the display devices, an organic light emitting display device displays an image using an organic light emitting element that may generate light by recombination of electrons and holes. The organic light emitting display device has a fast response speed, a high luminance and a large viewing angle, and may be driven with low power consumption.

Generally, a display device may display an image only on a front portion. However, recently, a display device which may display an image on a side portion has been developed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device manufacturing apparatus capable of laminating a curved display panel and a curved window with reliability.

Aspects of the disclosure also provide a display device manufacturing method capable of laminating a curved display panel and a curved window with reliability by using a display device manufacturing apparatus.

However, aspects of the disclosure are not restricted to those set forth herein. The above and other aspects of the disclosure will become more apparent to one of ordinary skill in the art to which the disclosure pertains by referencing the detailed description of the disclosure given below.

An embodiment provides a display device manufacturing apparatus that may include a support portion including a core portion and a conductive portion disposed over the core portion, wherein the core portion may include a first flat surface extending in a first direction; a second flat surface extending in the first direction and being opposite to the first flat surface; and a curved surface extending between the first flat surface and the second flat surface, and the conductive portion may include a first flat conductive portion overlapping the first flat surface of the core portion in a second direction; a second flat conductive portion overlapping the second flat surface of the core portion in the second direction; and a curved conductive portion extending between the first flat conductive portion and the second flat conductive portion.

The display device manufacturing apparatus may comprise a magnetic portion disposed over the support portion, wherein the magnetic portion may include a first flat magnetic portion overlapping the first flat conductive portion in the second direction; a second flat magnetic portion overlapping the second flat conductive portion in the second direction; and a curved magnetic portion extending between the first flat magnetic portion and the second flat magnetic portion.

A current may flow in the magnetic portion, and an electrostatic attractive force may be formed between the magnetic portion and the conductive portion.

The core portion may be in direct contact with the conductive portion.

The support portion may include a pad portion disposed over the conductive portion, wherein the pad portion may include a first flat pad portion overlapping the first flat conductive portion in the second direction; a second flat pad portion overlapping the second flat conductive portion in the second direction; and a curved pad portion extending between the first flat pad portion and the second flat pad portion.

The pad portion may be in direct contact with the conductive portion.

The display device manufacturing apparatus may further include a guide film portion disposed over the support portion, wherein the guide film portion may include a first flat film portion overlapping the first flat conductive portion in the second direction; a second flat film portion overlapping the second flat conductive portion in the second direction; and a curved film portion extending between the first flat film portion and the second flat film portion.

The guide film portion may be in direct contact with the support portion.

The first flat magnetic portion may include an end in contact with the curved magnetic portion; and another end opposite to the end, the first flat film portion and the second flat film portion may extend in the first direction from the another end of the first flat magnetic portion, and roller portions may be disposed on extended portions of the first flat film portion and the second flat film portion along the first direction from the another end of the first flat magnetic portion.

The extended portions of the first flat film portion and the second flat film portion may be fixed by the roller portions.

The display device manufacturing apparatus may further include a magnetic portion that moves at outside of the support portion in a direction from the curved conductive portion to the first flat conductive portion, or from the curved conductive portion to the second flat conductive portion.

A current may flow in the magnetic portion, and an electrostatic attractive force may be formed between the magnetic portion and the conductive portion.

An embodiment provides a display device manufacturing method may comprise disposing a display panel over a support portion which may include a first flat support portion, a second flat support portion opposing the first flat support portion, and a curved support portion extending between the first flat support portion to the second flat support portion; forming a curved display panel which may include forming a first flat panel portion corresponding to the first flat support portion, forming a second flat panel portion corresponding to the second flat support portion, and forming a curved panel portion corresponding to the curved support portion; disposing a curved window over the curved display panel to be spaced apart from the curved display panel, which may include disposing a first flat window portion corresponding to the first flat panel portion, disposing a second flat window portion corresponding to the second flat panel portion, and disposing a curved window portion corresponding to the curved panel portion; and attaching the curved display panel to the curved window by an electrostatic attractive force between a magnetic portion over the curved window and a conductive portion of the support portion.

The forming of the curved display panel may further include forming a panel window coupling member on an outer surface of the curved display panel.

The attaching of the curved display panel to the curved window may include attaching the curved display panel to the curved window by the panel window coupling member.

The display device manufacturing method may further include moving the support portion and the curved display panel toward the curved window, wherein the attaching of the curved display panel may include attaching an uppermost end of the curved display panel to an uppermost end of the curved window.

The attaching of the curved display panel to the curved window by the electrostatic attractive force may comprise attaching sequentially from portions adjacent to the uppermost ends of the curved display panel and the curved window to lowermost ends of the curved display panel and the curved window.

The display device manufacturing method may further include disposing the magnetic portion to overlap the curved window from an outside of the curved window, and operating sequentially the magnetic portion from an uppermost end to a lowermost end of the magnetic portion.

The display device manufacturing method may further include disposing the magnetic portion over the curved window, and moving the magnetic portion sequentially from an uppermost end to a lowermost end of the curved window.

The disposing of the display panel over the support portion may include disposing the display panel on a guide film portion overlapping the support portion, and the forming of the curved display panel may include tightening lower portions of the guide film portion by roller portions.

According to a display device manufacturing apparatus and a display device manufacturing method using the same according to an embodiment, it is possible to laminate a curved display panel and a curved window with reliability.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which:

FIG. 3 is a flowchart of a display device manufacturing method according to an embodiment;

DETAILED DESCRIPTION OF THE EMBODIMENTS

Figure 1:
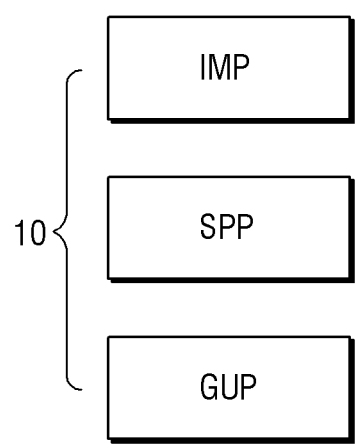
FIG. 1 is a block diagram of a display device manufacturing apparatus according to an embodiment.

Hereinafter, embodiments will be explained in detail with reference to the accompanying drawings.

Some of the parts which are not associated with the description may not be provided in order to describe embodiments of the disclosure and like reference numerals refer to like elements throughout the specification.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that although the terms "first," "second," etc. may be used herein to describe various components, these components should not be limited by these terms. These components are only used to distinguish one component from another. For example, a first element referred to as a first element in one embodiment may be referred to as a second element in another embodiment without departing from the scope of the appended claims.

As used herein, the singular forms "a," "an" and "the" are intended to include the plural forms as well, unless the context clearly indicates otherwise.

It will be further understood that the terms "comprises" and/or "comprising" "includes" and/or "including", "have" and/or "having" are used in this specification, they or it may specify the presence of stated features, integers, steps, operations, elements and/or components, but do not preclude the presence or addition of other features, integers, steps, operations, elements, components, and/or any combination thereof.

When a layer, film, region, substrate, or area, or element is referred to as being "on" another layer, film, region, substrate, or area, or element, it may be directly on the other film, region, substrate, or area, or element, or intervening films, regions, substrates, or areas, or elements may be present therebetween. Conversely, when a layer, film, region, substrate, or area, or element, is referred to as being "directly on" another layer, film, region, substrate, or area, or element, intervening layers, films, regions, substrates, or areas, may be absent therebetween. Further when a layer, film, region, substrate, or area, or element, is referred to as being "below" another layer, film, region, substrate, or area, or element, it may be directly below the other layer, film, region, substrate, or area, or element, or intervening layers, films, regions, substrates, or areas, or elements, may be present therebetween. Conversely, when a layer, film, region, substrate, or area, or element, is referred to as being "directly below" another layer, film, region, substrate, or area, or element, intervening layers, films, regions, substrates, or areas, or elements may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations Sizes of components in the drawings may be exaggerated for convenience of explanation. In other words, since sizes and thicknesses of components in the drawings are arbitrarily illustrated for convenience of explanation, the following embodiments are not limited thereto.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

In the specification, an expression such as "A and/or B" indicates A, B, or A and B. Also, an expression such as "at least one of A and B" indicates A, B, or A and B.

In embodiments below, when a component is referred to as being "on a plane," it is understood that a component is viewed from the top, and when a component is referred to as being "on a schematic cross section," it is understood that the component is vertically cut and viewed from the side.

It will be understood that when a layer, region, or component is referred to as being "connected" or "coupled" to another layer, region, or component, it may be "directly connected" or "directly coupled" to the other layer, region, or component and/or may be "indirectly connected" or "indirectly coupled" to the other layer, region, or component with other layers, regions, or components interposed therebetween. For example, it will be understood that when a layer, region, or component is referred to as being "electrically connected" or "electrically coupled" to another layer, region, or component, it may be "directly electrically connected" or "directly electrically coupled" to the other layer, region, or component and may be "indirectly electrically connected" or "indirectly electrically coupled" to the other layer, region, or component with other layers, regions, or components interposed therebetween.

Also, when an element is referred to as being "in contact" or "contacted" or the like to another element, the element may be in "electrical contact" or in "physical contact" with another element; or in "indirect contact" or in "direct contact" with another element.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that may not be perpendicular to one another.

As used herein, the term "unit" or "module" denotes a structure or element as illustrated in the drawings and as described in the specification. However, the disclosure is not limited thereto. The term "unit" or "module" is not to be limited to that which is illustrated in the drawings Unless otherwise defined, all terms (including technical and scientific terms) used herein have the same meaning as commonly understood by one of ordinary skill in the art to which embodiments pertain. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
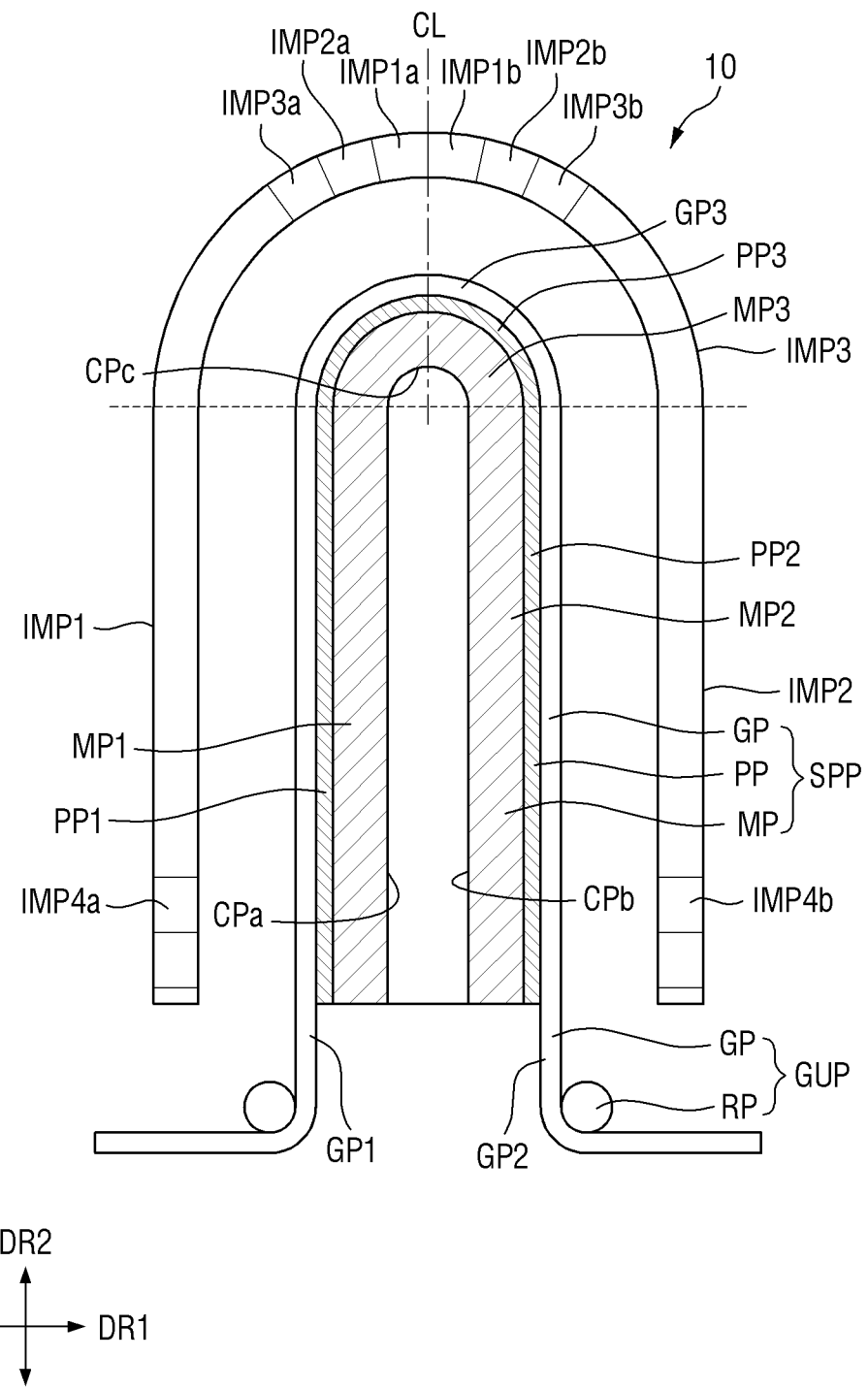
FIG. 2 is a schematic cross-sectional view of a display device manufacturing apparatus according to an embodiment.

FIG. 1 is a block diagram of a display device manufacturing apparatus according to an embodiment. FIG. 2 is a schematic cross-sectional view of a display device manufacturing apparatus according to an embodiment.

In an embodiment, a first direction DR1 and a second direction DR2 may represent different directions crossing or intersecting each other, for example, directions crossing or intersecting at a right angle in a plan view. In the illustrated drawings, the first direction DR1 may represent a horizontal direction (width direction) of a display device manufacturing apparatus 10, and the second direction DR2 may represent a vertical direction (longitudinal direction) of the display device manufacturing apparatus 10. In the following embodiments, one or a side of the first direction DR1 may represent a direction toward the right side in a plan view, and the other side or another side of the first direction DR1 may represent a direction toward the left side in a plan view. One or a side of the second direction DR2 may represent an upward direction in a plan view, and the other side or another side of the second direction DR2 may represent a downward direction in a plan view. It should be understood, however, that a direction mentioned in an embodiment refers to a relative direction and an embodiment is not limited to the direction mentioned.

Referring to FIGS. 1 and 2, the display device manufacturing apparatus 10 is a manufacturing apparatus that may laminate (or may couple) a display panel and a window of a display device. For example, the display device manufacturing apparatus 10 may linearly deform the display panel of the display device to form a curved display panel, and laminate (or couple) the curved display panel which has been linearly deformed and a curved window with each other. It is to be understood that curved may include substantially curved.

The display device may refer to any electronic device that may include a display screen. Examples of the display device may include a television, a laptop computer, a monitor, a billboard, an Internet-of-Things device and the like as well as portable electronic devices such as a mobile phone, a smartphone, a tablet personal computer (PC), an electronic watch, a smart watch, a watch phone, a mobile communication terminal, an electronic notebook, an electronic book, a portable multimedia player (PMP), a navigation device, a game machine, a digital camera, which may include a display screen.

The display device manufacturing apparatus 10 may include a magnetic portion IMP, a support portion SPP, and a guide portion GUP. It is to be understood that portion may also mean region or area.

The support portion SPP may include a core portion CP, a conductive portion MP covering or overlapping the core portion CP from the outside of the core portion CP, and a pad portion PP covering or overlapping the conductive portion MP from the outside of the conductive portion MP.

The core portion CP may include a first flat surface CPa extending in the second direction DR2, and a second flat surface CPb extending in the second direction DR2 to oppose the first flat surface CPa, and a curved surface CPc connecting the first flat surface CPa to the second flat surface CPb.

The first and second flat surfaces CPa and CPb may have a substantially straight linear shape extending in the second direction DR2. The curved surface CPc may have a predetermined curvature. The curved surface CPc may have the predetermined curvature of a single value. In an embodiment, the curved surface CPc may have the predetermined curvatures of different values.

The core portion CP may serve to support the conductive portion MP and the pad portion PP. The core portion CP may include a rigid material. The core portion CP may include, for example, a non-metal plate or a metal plate. The rigid material that may be included in the core portion CP may have excellent hardness or strength compared to materials that may be included in the conductive portion MP and the pad portion PP.

The conductive portion MP may cover or overlap the core portion CP from the outside of the core portion CP. The conductive portion MP may include a first flat conductive portion MP1 overlapping the first flat surface CPa of the core portion CP in the first direction DR1, a second flat conductive portion MP2 overlapping the second flat surface CPb of the core portion CP in the first direction DR1 and a curved conductive portion MP3 connecting the first flat conductive portion MP1 to the second flat conductive portion MP2.

The conductive portion MP may include a conductive material that may generate an electrostatic attractive force with the magnetic portion IMP in a case that an induced current is applied to the magnetic portion IMP, which will be described later.

The conductive portion MP may include, for example, at least one metal selected from the group consisting of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu).

The core portion CP and the conductive portion MP may directly contact each other. For example, the first flat surface CPa, the second flat surface CPb and the curved surface CPc of the core portion CP may directly contact the first flat conductive portion MP1, the second flat conductive portion MP2, and the curved conductive portion MP3 of the conductive portion MP, respectively.

The first and second flat conductive portions MP1 and MP2 of the conductive portion MP may have a substantially straight linear shape extending in the second direction DR2. The curved conductive portion MP3 may have a predetermined curvature. The predetermined curvature of the curved conductive portion MP3 may be greater than the curvature of the curved surface CPc of the core portion CP. The curved conductive portion MP3 may have the predetermined curvature of a single value. In an embodiment, the curved conductive portion MP3 may have the predetermined curvatures of different values. For example, in a case that the curved surface CPc has the predetermined curvature of the single value, the curved conductive portion MP3 may also have the predetermined curvature of the single value. Alternatively, in a case that the curved surface CPc has the predetermined curvatures of the different values, the curved conductive portion MP3 may also have the predetermined curvatures of the different values.

The pad portion PP may cover or overlap the conductive portion MP from the outside of the conductive portion MP.

The pad portion PP may include a first flat pad portion PP1 overlapping the first flat conductive portion MP1 in the first direction DR1, a second flat pad portion PP2 overlapping the second flat conductive portion MP2 in the first direction DR1, and a curved pad portion PP3 connecting the first flat pad portion PP1 to the second flat pad portion PP2.

The pad portion PP may cover or overlap the conductive portion MP from the outside of the conductive portion MP and may include an elastic material to prevent the curved display panel and/or the curved window from being physically damaged in a case that the curved display panel disposed over the support portion SPP may be connected or coupled with the curved window by the conductive portion MP. For example, the pad portion PP may include a flexible material such as rubber. In an embodiment, the pad portion PP may include fluid. The rubber material and the fluid may include any rubber material and fluid within the spirit and the scope of the disclosure.

The pad portion PP may directly contact the conductive portion MP.

For example, the first flat conductive portion MP1, the second flat conductive portion MP2 and the curved conductive portion MP3 of the conductive portion MP may directly contact the first flat pad portion PP1, the second flat pad portion PP2, and the curved pad portion PP3 of the pad portion PP, respectively.

The first and second flat pad portions PP1 and PP2 of the pad portion PP may have a substantially straight linear shape extending in the second direction DR2. The curved pad portion PP3 may have a predetermined curvature. The predetermined curvature of the curved pad portion PP3 may be greater than the curvature of the curved conductive portion MP3 of the conductive portion MP. The curved pad portion PP3 may have the predetermined curvature of a single value. In an embodiment, the curved pad portion PP3 may have the predetermined curvatures of different values. For example, in a case that the curved conductive portion MP3 has the predetermined curvature of the single value, the curved pad portion PP3 may also have the predetermined curvature of the single value. Alternatively, in a case that the curved conductive portion MP3 has the predetermined curvatures of the different values, the curved pad portion PP3 may also have the predetermined curvatures of the different values.

The first flat surface CPa, the first flat conductive portion MP1, and the first flat pad portion PP1 of the support portion SPP may form a first flat support portion. The second flat surface CPb, the second flat conductive portion MP2, and the second flat pad portion PP2 of the support portion SPP may form a second flat support portion. The curved surface CPc, the curved conductive portion MP3 and the curved pad portion PP3 of the support portion SPP may form a curved support portion.

The guide portion GUP may cover or overlap the support portion SPP from the outside of the support portion SPP. The guide portion GUP may include a guide film GP and roller portions RP disposed on the guide film GP.

The guide film GP may include a first flat film portion GP1 overlapping the first flat conductive portion MP1 in the first direction DR1, a second flat film portion GP2 overlapping the second flat conductive portion MP2 in the first direction DR1, and a curved film portion GP3 connecting the first flat film portion GP1 to the second flat film portion GP2.

The guide film GP may directly contact the support portion SPP.

For example, the guide film GP may directly contact the pad portion PP of the support portion SPP. For example, the first flat film portion GP1, the second flat film portion GP2, and the curved film portion GP3 may directly contact the first flat pad portion PP1, the second flat pad portion PP2, and the curved pad portion PP3, respectively.

The first and second flat film portions GP1 and GP2 of the guide film GP may have a substantially straight linear shape extending in the second direction DR2. The curved film portion GP3 may have a predetermined curvature. The predetermined curvature of the curved film portion GP3 may be greater than the curvature of the curved pad portion PP3 of the pad portion PP. The curved film portion GP3 may have the predetermined curvature of a single value. In an embodiment, the curved film portion GP3 may have the predetermined curvatures of different values. For example, in a case that the curved pad portion PP3 has the predetermined curvature of the single value, the curved film portion GP3 may also have the predetermined curvature of the single value. Alternatively, in a case that the curved pad portion PP3 has the predetermined curvatures of the different values, the curved film portion GP3 may also have the predetermined curvatures of the different values.

The magnetic portion IMP may cover or overlap the support portion SPP from the outside of the support portion SPP while being spaced apart from the support portion SPP.

The magnetic portion IMP may be spaced apart from the support portion SPP while interposing the guide film GP therebetween. The magnetic portion IMP may be positioned or disposed outside of the guide film GP with a space therebetween.

The magnetic portion IMP may include a first flat magnetic portion IMP1 overlapping the first flat support portion in the first direction DR1, a second flat magnetic portion IMP2 overlapping the second flat support portion in the first direction DR1, and a curved magnetic portion IMP3 connecting the first flat magnetic portion IMP1 to the second flat magnetic portion IMP2.

The magnetic portion IMP may be configured or formed such that an induced current may flow therein.

The magnetic portion IMP and the conductive portion MP may be configured or formed such that an electrostatic attractive force may act therebetween in a case that the induced current may flow in the magnetic portion IMP.

The magnetic portion IMP, the guide film GP, and the support portion SPP may have substantially symmetrical shapes in the first direction DR1 with respect to a center line CL extending in the second direction DR2. The magnetic portion IMP, the guide film GP, and the support portion SPP may meet the center line CL respectively at uppermost ends (one of the ends in the second direction DR2 in the drawing) of the magnetic portion IMP, the guide film GP, and the support portion SPP.

In an embodiment, the support portion SPP and the curved display panel, which have been disposed on the guide film GP to be curved, may be moved to one or a side in the second direction DR2 so that an uppermost end (one or an end in the second direction DR2) of the curved display panel may be disposed adjacent to an uppermost end (one or an end in the second direction DR2) of the curved window placed or disposed between the curved display panel and the magnetic portion IMP. Then, the magnetic portion IMP may be operated such that an induced current may be applied to the magnetic portion IMP, thereby causing an electrostatic attractive force between the magnetic portion IMP and the support portion SPP. Accordingly, the curved display panel and the curved window may be attached to each other (via a panel window coupling member between the curved display panel and the curved window) by the electrostatic attractive force.

The first flat magnetic portion IMP1 may include one or an end contacting the curved magnetic portion IMP3 and the other or another end located or disposed opposite to the one or an end. The other or another end of the first flat magnetic portion IMP1 may be the other end in the second direction DR2 of FIG. 2.

The first flat film portion GP1 and the second flat film portion GP2 may extend respectively in the second direction DR2 from the other end of the first flat magnetic portion IMP1. The roller portions RP may be disposed on extended portions of the first and second flat film portions GP1 and GP2 along the second direction DR2 from the other end of the first flat magnetic portion IMP1.

The roller portions RP may be disposed on surfaces of the first and second flat film portions GP1 and GP2 which may face the magnetic portion IMP. The roller portions RP may be directly disposed on the surfaces of the first and second flat film portions GP1 and GP2 which may face the magnetic portion IMP.

The extended portions of the first and second flat film portions GP1 and GP2 along the second direction DR2 from the other end of the first flat magnetic portion IMP1 may be bent in the first direction DR1 by the roller portions RP.

The roller portions RP may tightly fix the first and second flat film portions GP1 and GP2 in the manner of bending them as described above, and accordingly in a case that the display panel may be arranged or disposed on the curved guide film GP to form a curved display panel, it may be possible to prevent the waviness of the curved display panel due to the guide film GP.

The magnetic portion IMP may be sequentially operated from one or a side to the other or another side in the second direction DR2.

The magnetic portion IMP may include first sub-magnetic portions IMP1a, IMP2a, IMP3a and IMP4a, and second sub-magnetic portions IMP1b, IMP2b, IMP3b and IMP4b which may be sequentially arranged or disposed from an uppermost end (one end of in the second direction DR2) of the curved magnetic portion IMP3 to a lowermost end (the other end in the second direction DR2) of each of the first and second flat magnetic portions IMP1 and IMP2.

The first sub-magnetic portions IMP1a to IMP4a may be disposed in the curved magnetic portion IMP3 and the first flat magnetic portion IMP1 of the magnetic portion IMP, and the second sub-magnetic portions IMP1b to IMP4b may be disposed in the curved magnetic portion IMP3 and the second flat magnetic portion IMP2 of the magnetic portion IMP.

The first sub-magnetic portions IMP1a to IMP4a may be sequentially operated in the arrangement order from one or a side to the other or another side in the second direction DR2. The second sub-magnetic portions IMP1b to IMP4b may be sequentially operated in the arrangement order from one or a side to the other or another side in the second direction DR2. Overlapping portions in the first direction DR1 among the first sub-magnetic portions IMP1a to IMP4a and the second sub-magnetic portions IMP1b to IMP4b may be simultaneously operated. For example, the first-first sub-magnetic portion IMP1a of the first sub-magnetic portions IMP1a to IMP4a and the second-first sub-magnetic portion IMP1b of the second sub-magnetic portions IMP1b to IMP4b may be simultaneously operated. The first-second sub-magnetic portion IMP2a of the first sub-magnetic portions IMP1a to IMP4a and the second-second sub-magnetic portion IMP2b of the second sub-magnetic portions IMP1b to IMP4b may be simultaneously operated.

In an embodiment, the first sub-magnetic portions IMP1a to IMP4a may be sequentially operated from the one or a side to the other or another side in the second direction DR2, and then the second sub-magnetic portions IMP1b to IMP4b may be sequentially operated from the one or a side to the other or another side in the second direction DR2.

FIG. 2 illustrates that the first sub-magnetic portions IMP1a to IMP4a may include four sections, but the disclosure is not limited thereto. The first sub-magnetic portions may include five or more sections. Similarly, although the second sub-magnetic portions IMP1b to IMP4b are illustrated to include four sections, the disclosure is not limited thereto, and the second sub-magnetic portions may include five or more sections.

In an embodiment, the support portion SPP and the curved display panel, which have been disposed on the guide film GP to be curved, may be moved to the one or a side in the second direction DR2 so that the uppermost end (the one or an end in the second direction DR2) of the curved display panel may be disposed adjacent to the uppermost end (the one or an end in the second direction DR2) of the curved window placed between the curved display panel and the magnetic portion IMP. Then, as described above, the magnetic portion IMP may be operated such that an induced current may be sequentially applied from the one or a side section in the second direction DR2, which may be adjacent to the uppermost end (the one or an end in the second direction DR2) of the magnetic portion IMP, to the other or the another side section in the second direction DR2. Accordingly, the curved display panel and the curved window may be coupled (the curved display panel may be laminated on the curved window) sequentially from the one side portions in the second direction DR2 adjacent to the uppermost portions thereof to the other side portions in the second direction DR2.

Accordingly, in the coupling process of the curved display panel and the curved window, air present between the curved display panel and the curved window may be pushed outside the curved display panel and the curved window, and therefore it may be possible to prevent air bubbles and the like from remaining between the curved display panel and the curved window.

Hereinafter, a display device manufacturing method using the display device manufacturing apparatus according to an embodiment will be described. In the following embodiment, the same components as those of the above-described embodiment are denoted by the same reference numerals, and a description thereof will be omitted or simplified.

FIG. 3 is a flowchart of a display device manufacturing method according to an embodiment. FIGS. 4 to 7 are schematic cross-sectional views showing the steps of a display device manufacturing method according to an embodiment.

A display device manufacturing method according to an embodiment may include disposing a display panel 30 over the support portion SPP, which may have the first flat support portion, the second flat support portion opposing the first flat support portion and the curved support portion connecting the first flat support portion to the second flat support portion, and forming a curved display panel 30 having a first flat panel portion 31 corresponding to the first flat support portion, a second flat panel portion 32 corresponding to the second flat support portion, and a curved panel portion 33 corresponding to the curved support portion (step S10), disposing a curved window 50 outside the curved display panel 30 with a space therebetween, the curved window 50 having a first flat window portion 51 corresponding to the first flat panel portion 31, a second flat window portion 52 corresponding to the second flat panel portion 32 and a curved window portion 53 corresponding to the curved panel portion 33 (step S30), and attaching the curved display panel 30 to the curved window 50 by the electrostatic attractive force acting between the magnetic portion IMP outside the curved window 50 and the conductive portion MP of the support portion SPP (step S50).

The support portion SPP may include the core portion CP and the pad portion PP as well as the conductive portion MP. The core portion CP may include the first flat surface CPa extending in the second direction DR2, and the second flat surface CPb extending in the second direction DR2 that may oppose the first flat surface CPa, and the curved surface CPc connecting the first flat surface CPa to the second flat surface CPb. The core portion CP may serve to support the conductive portion MP and the pad portion PP. The core portion CP may include a rigid material. The conductive portion MP may cover or overlap the core portion CP from the outside of the core portion CP. The conductive portion MP may include the first flat conductive portion MP1 overlapping the first flat surface CPa of the core portion CP in the first direction DR1, the second flat conductive portion MP2 overlapping the second flat surface CPb in the first direction DR1 and the curved conductive portion MP3 connecting the first flat conductive portion MP1 and the second flat conductive portion MP2. The conductive portion MP may include a conductive material that may generate an electrostatic attractive force with the magnetic portion IMP in a case that an induced current may be applied to the magnetic portion IMP The core portion CP and the conductive portion MP may directly contact each other. For example, the first flat surface CPa, the second flat surface CPb and the curved surface CPc of the core portion CP may directly contact the first flat conductive portion MP1, the second flat conductive portion MP2, and the curved conductive portion MP3 of the conductive portion MP, respectively. The pad portion PP may cover or overlap the conductive portion MP from the outside of the conductive portion MP. The pad portion PP may include the first flat pad portion PP1 overlapping the first flat conductive portion MP1 in the first direction DR1, the second flat pad portion PP2 overlapping the second flat conductive portion MP2 in the first direction DR1, and the curved pad portion PP3 connecting the first flat pad portion PP1 and the second flat pad portion PP2. The pad portion PP may cover or overlap the conductive portion MP from the outside of the conductive portion MP and may include an elastic material to prevent the curved display panel and/or the curved window from being physically damaged in a case that the curved display panel disposed over the support portion SPP is coupled with the curved window by the conductive portion MP. For example, the pad portion PP may include a flexible material such as rubber. In an embodiment, the pad portion PP may include fluid. The pad portion PP may directly contact the conductive portion MP. For example, the first flat conductive portion MP1, the second flat conductive portion MP2 and the curved conductive portion MP3 of the conductive portion MP may directly contact the first flat pad portion PP1, the second flat pad portion PP2, and the curved pad portion PP3 of the pad portion PP, respectively. The first flat surface CPa, the first flat conductive portion MP1, and the first flat pad portion PP1 of the support portion SPP may form the first flat support portion. The second flat surface CPb, the second flat conductive portion MP2, and the second flat pad portion PP2 of the support portion SPP may form the second flat support portion. The curved surface CPc, the curved conductive portion MP3 and the curved pad portion PP3 of the support portion SPP may form the curved support portion.

The guide portion GUP may cover or overlap the support portion SPP from the outside of the support portion SPP. The guide portion GUP may include the guide film GP and the roller portions RP disposed on the guide film GP. The guide film GP may include the first flat film portion GP1 overlapping the first flat conductive portion MP1 in the first direction DR1, the second flat film portion GP2 overlapping the second flat conductive portion MP2 in the first direction DR1, and the curved film portion GP3 connecting the first flat film portion GP1 and the second flat film portion GP2. The guide film GP may directly contact the support portion SPP. For example, the guide film GP may directly contact the pad portion PP of the support portion SPP. For example, the first flat film portion GP1, the second flat film portion GP2, and the curved film portion GP3 may directly contact the first flat pad portion PP1, the second flat pad portion PP2, and the curved pad portion PP3, respectively.

The magnetic portion IMP may cover or overlap the support portion SPP from the outside of the support portion SPP while being spaced apart from the support portion SPP. The magnetic portion IMP may be spaced apart from the support portion SPP while interposing the guide film GP therebetween. The magnetic portion IMP may be positioned or disposed outside the guide film GP with a space therebetween. The magnetic portion IMP may include the first flat magnetic portion IMP1 overlapping the first flat support portion in the first direction DR1, the second flat magnetic portion IMP2 overlapping the second flat support portion in the first direction DR1, and the curved magnetic portion IMP3 connecting the first flat magnetic portion IMP1 to the second flat magnetic portion IMP2. The magnetic portion IMP may be configured or formed such that an induced current may flow therein. The magnetic portion IMP and the conductive portion MP may be configured or formed such that the electrostatic attractive force may act therebetween in a case that the induced current may flow in the magnetic portion IMP.

The magnetic portion IMP, the guide film GP, and the support portion SPP may have the substantially symmetrical shapes in the first direction DR1 with respect to the center line CL extending in the second direction DR2. The magnetic portion IMP, the guide film GP, and the support portion SPP may meet the center line CL respectively at uppermost ends (one among ends in the second direction DR2 in the drawing) of the magnetic portion IMP, the guide film GP, and the support portion SPP.

In an embodiment, the support portion SPP and the curved display panel, which have been disposed on the guide film GP to be curved, may be moved to the one or a side in the second direction DR2 so that the uppermost end (the one or the another end in the second direction DR2) of the curved display panel may be disposed adjacent to the uppermost end (the one or an end in the second direction DR2) of the curved window placed between the curved display panel and the magnetic portion IMP. Then, the magnetic portion IMP may be operated such that an induced current may be applied to the magnetic portion IMP, thereby causing the electrostatic attractive force between the magnetic portion IMP and the support portion SPP. Accordingly, the curved display panel and the curved window may be attached to each other (via the panel window coupling member between the curved display panel and the curved window) by the electrostatic attractive force.

The first flat magnetic portion IMP1 may include the one end contacting the curved magnetic portion IMP3 and the other end located or disposed opposite to the one end. The other end of the first flat magnetic portion IMP1 may be the other end in the second direction DR2 of FIG. 2.

The first flat film portion GP1 and the second flat film portion GP2 may extend respectively in the second direction DR2 from the other end of the first flat magnetic portion IMP1. The roller portions RP may be disposed on the respective extended portions of the first and second flat film portions GP1 and GP2 along the second direction DR2 from the other end of the first flat magnetic portion IMP1.

The roller portions RP may be disposed on the surfaces of the first and second flat film portions GP1 and GP2 which may face the magnetic portion IMP. The roller portions RP may be directly disposed on the surfaces of the first and second flat film portions GP1 and GP2 which may face the magnetic portion IMP.

The extended portions of the first and second flat film portions GP1 and GP2 along the second direction DR2 from the other end of the first flat magnetic portion IMP1 may be bent in the first direction DR1 by the roller portions RP. The roller portions RP may tightly fix the first and second flat film portions GP1 and GP2 in the manner of bending them as described above, and accordingly in a case that the display panel may be arranged or disposed on the curved guide film GP to form a curved display panel, it may be possible to prevent the waviness of the curved display panel due to the guide film GP.

In step S10 of forming the curved display panel 30, a panel window coupling member 40 may be formed on an outer surface (or one surface) of the curved display panel 30. In step S50 of attaching the curved display panel 30 to the curved window 50, the curved display panel 30 and the curved window 50 may be attached via the panel window coupling member 40.

In step S10 of disposing the display panel 30 over the support portion SPP, the display panel 30 may be disposed on the guide film GP covering or overlapping the support portion SPP, and in step S10 of forming the curved display panel 30, lower portions of the guide film GP may be tightened by the roller portions RP.

The extended portions of the first and second flat film portions GP1 and GP2 along the second direction DR2 from the other end of the first flat magnetic portion IMP1 may be bent in the first direction DR1 by the roller portions RP.

The roller portions RP may tightly fix the first and second flat film portions GP1 and GP2 in the manner of bending them as described above, and accordingly in a case that the display panel 30 may be arranged or disposed on the curved guide film GP to form the curved display panel 30, it may be possible to prevent the waviness of the curved display panel 30 due to the guide film GP.

Figure 4:
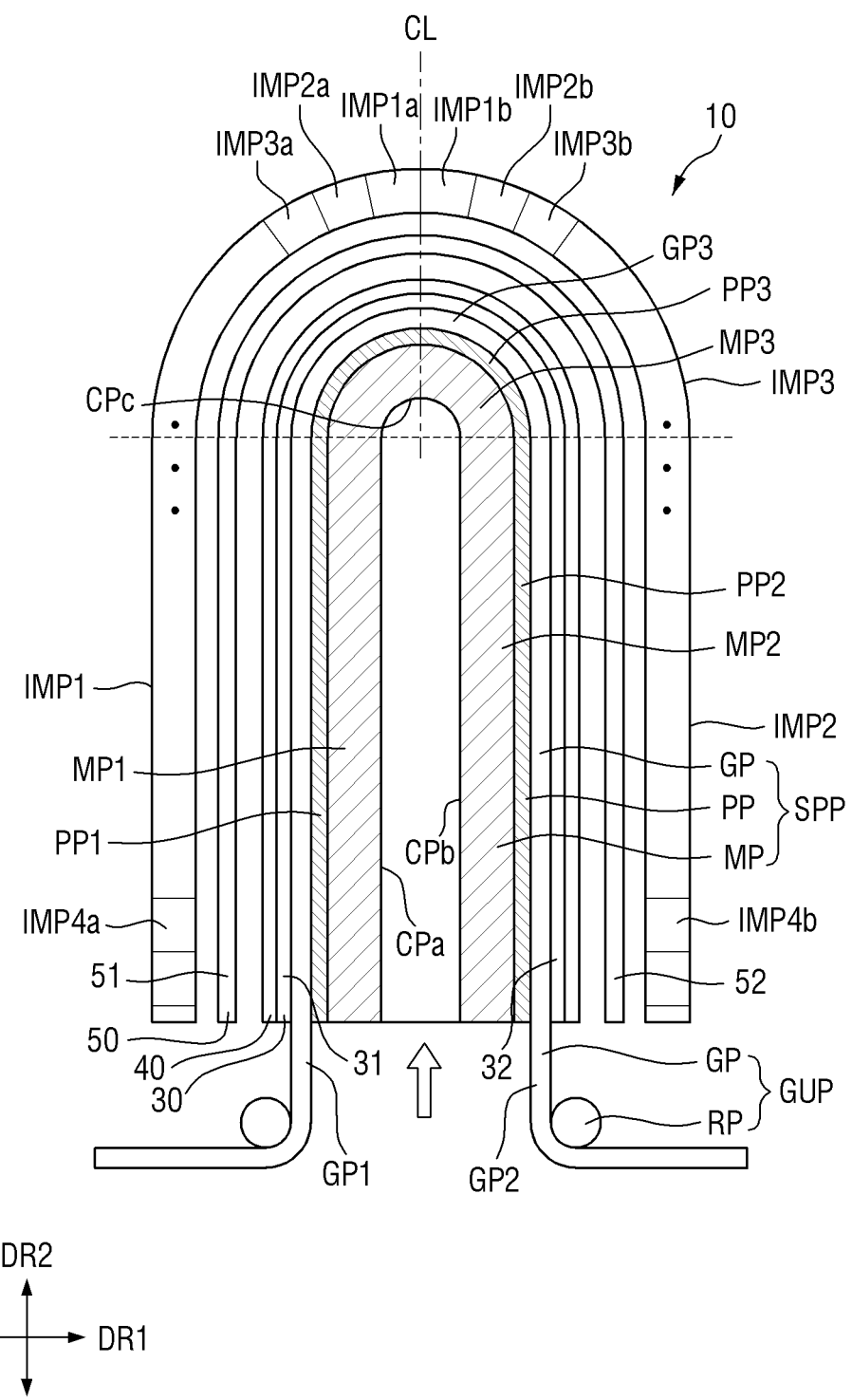
FIGS. 4 to 7 are schematic cross-sectional views showing the steps of a display device manufacturing method according to an embodiment.
Figure 5:
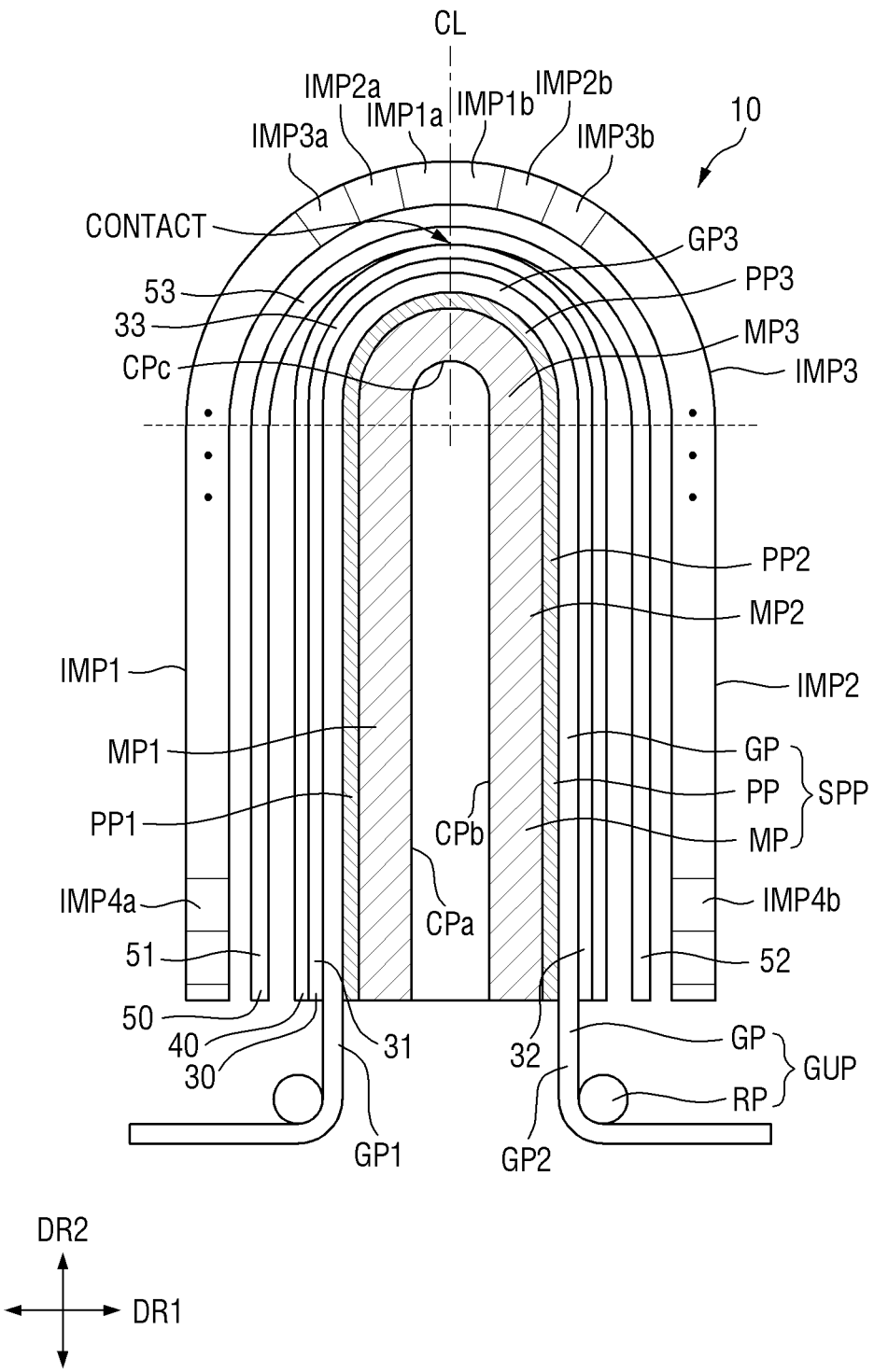

Referring to FIGS. 4 and 5, between step S30 of disposing the curved window 50 and step S50 of attaching the curved display panel 30 to the curved window 50 by the electrostatic attractive force, the support portion SPP, the guide portion GUP, the curved display panel 30 and the panel window coupling member 40 formed or disposed on the curved display panel 30 may be moved to the one or a side in the second direction DR2 so that the uppermost end (the one or an end in the second direction DR2 or the curved panel portion 33) of the curved display panel 30 may be coupled with the uppermost end (the one or an end in the second direction DR2 or the curved window portion 53) of the curved window 50 via the panel window coupling member 40.

In an embodiment, coupling the uppermost end (the one or an end in the second direction DR2 or the curved panel portion 33) of the curved display panel 30 with the uppermost end (the one or an end in the second direction DR2 or the curved window portion 53) of the curved window 50 via the panel window coupling member 40 may include moving the support portion SPP, the guide portion GUP, and the curved display panel 30 in the second direction DR2 by using the magnetic portion IMP outside the curved window 50.

Figure 6:
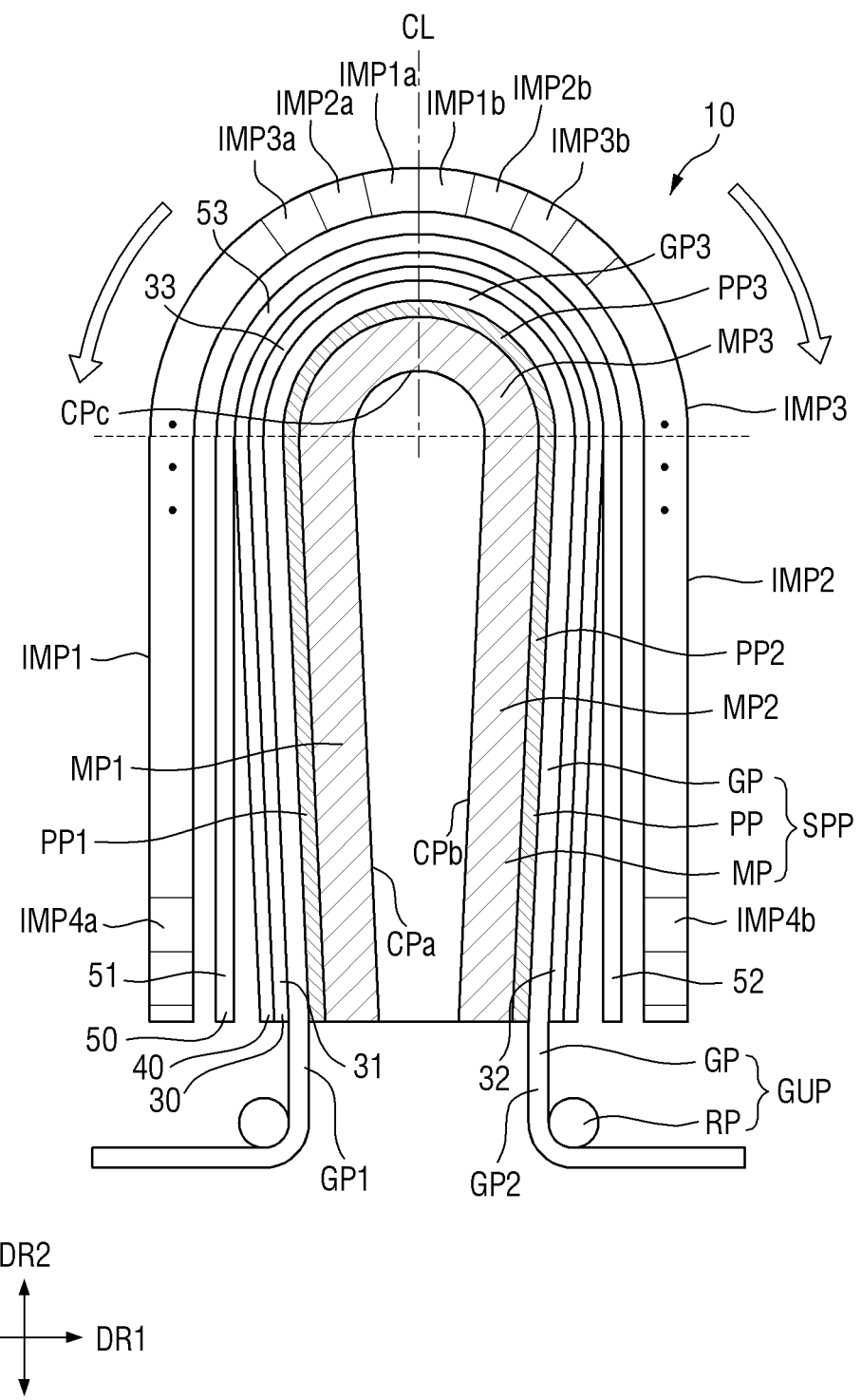
Figure 7:
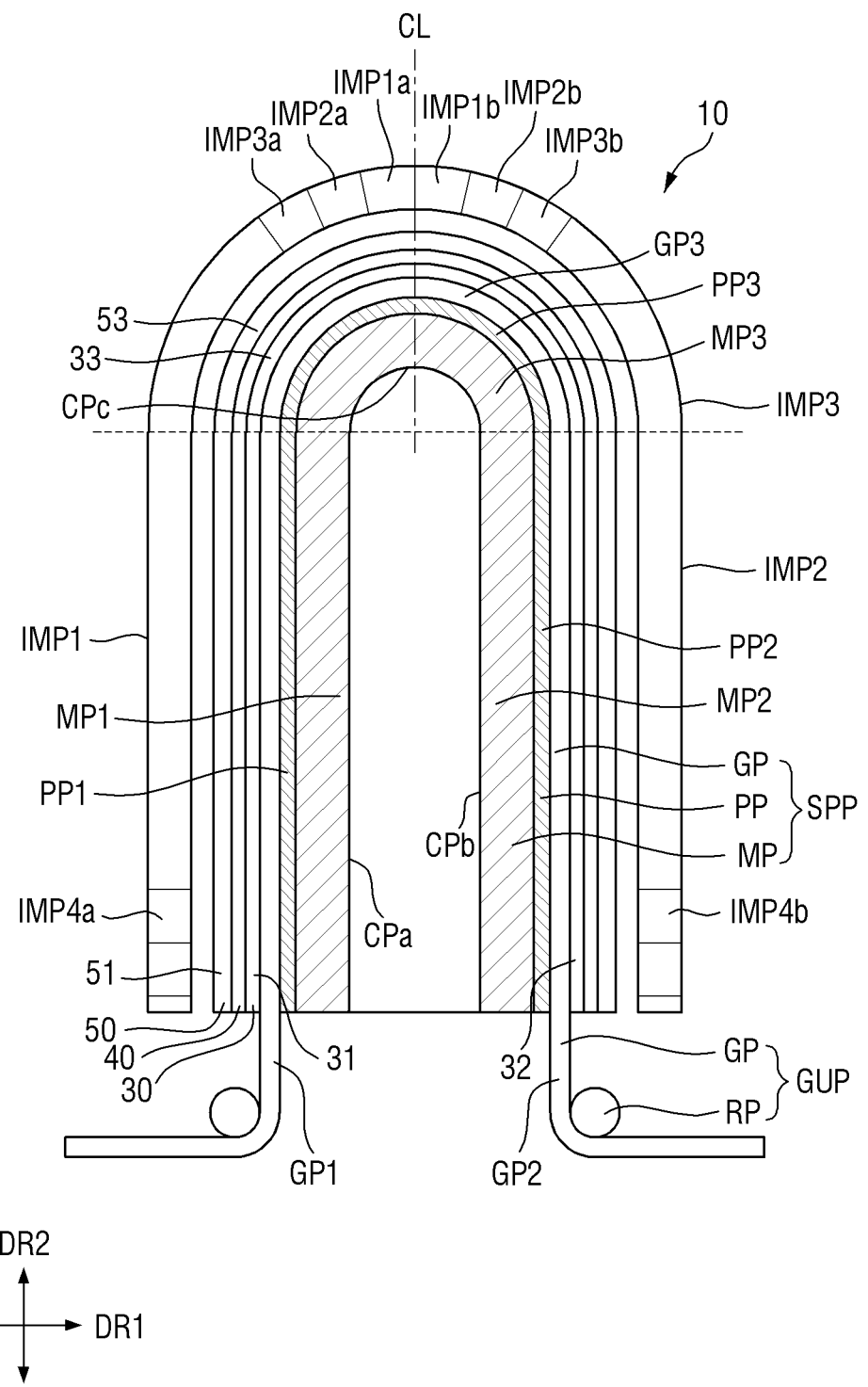

Subsequently, referring to FIGS. 6 and 7, the curved display panel 30 and the curved window 50 may be attached by the electrostatic attractive force acting between the magnetic portion IMP outside the curved window 50 and the conductive portion MP of the support portion SPP (step S50).

In step S50 of attaching the curved display panel 30 to the curved window 50 by the electrostatic attractive force, attachment may be performed sequentially from portions adjacent to the uppermost ends (the one ends in the second direction DR2) of the curved display panel 30 and the curved window 50 to the lowermost ends (the other ends in the second direction DR2) thereof.

As described above, the magnetic portion IMP may be sequentially operated from the one or a side to the other or another side in the second direction DR2. The magnetic portion IMP may include the first sub-magnetic portions IMP1a to IMP4a, and the second sub-magnetic portions IMP1b to IMP4b which may be sequentially arranged or disposed from the uppermost end (the one or an end in the second direction DR2) of the curved magnetic portion IMP3 to the lowermost end (the other or another end in the second direction DR2) of each of the flat magnetic portions IMP1 and IMP2. The first sub-magnetic portions IMP1a to IMP4a may be disposed in the curved magnetic portion IMP3 and the first flat magnetic portion IMP1 of the magnetic portion IMP, and the second sub-magnetic portions IMP1b to IMP4b may be disposed in the curved magnetic portion IMP3 and the second flat magnetic portion IMP2 of the magnetic portion IMP.

The first sub-magnetic portions IMP1a to IMP4a may be sequentially operated in the arrangement order from one or a side to the other or another side in the second direction DR2. The second sub-magnetic portions IMP1b to IMP4b may be sequentially operated in the arrangement order from one or a side to the other or another side in the second direction DR2. The overlapping portions in the first direction DR1 among the first sub-magnetic portions IMP1a to IMP4a and the second sub-magnetic portions IMP1b to IMP4b may be simultaneously operated. For example, the first-first sub-magnetic portion IMP1a of the first sub-magnetic portions IMP1a to IMP4a and the second-first sub-magnetic portion IMP1b of the second sub-magnetic portions IMP1b to IMP4b may be simultaneously operated. The first-second sub-magnetic portion IMP2a of the first sub-magnetic portions IMP1a to IMP4a and the second-second sub-magnetic portion IMP2b of the second sub-magnetic portions IMP1b to IMP4b may be simultaneously operated.

In an embodiment, the first sub-magnetic portions IMP1a to IMP4a may be sequentially operated from the one or a side to the other or another side in the second direction DR2, and then the second sub-magnetic portions IMP1b to IMP4b may be sequentially operated from the one or a side to the other or another side in the second direction DR2.

In an embodiment, the support portion SPP and the curved display panel 30, which have been disposed on the guide film GP to be curved, may be moved to the one or a side in the second direction DR2 so that the uppermost end (the one or an end in the second direction DR2) of the curved display panel 30 may be disposed adjacent to the uppermost end (the one or an end in the second direction DR2) of the curved window 50 placed between the curved display panel 30 and the magnetic portion IMP. Then, as described above, the magnetic portion IMP may be operated such that an induced current may be sequentially applied from the one or a side section in the second direction DR2, which may be adjacent to the uppermost end (the one or an end in the second direction DR2) of the magnetic portion IMP, to the other or another side section in the second direction DR2. Thus, the curved display panel 30 and the curved window 50 may be coupled (the curved display panel 30 may be laminated on the curved window 50) sequentially from the one side portions in the second direction DR2 adjacent to the uppermost portions thereof to the other side portions in the second direction DR2.

Accordingly, in the coupling process of the curved display panel 30 and the curved window 50, air present between the curved display panel 30 and the curved window 50 may be pushed outside the curved display panel 30 and the curved window 50, and therefore it may be possible to prevent air bubbles and the like from remaining between the curved display panel 30 and the curved window 50.

Hereinafter, a display device manufacturing apparatus 10_1 according to an embodiment will be described.

The display device manufacturing apparatus 10_1 according to an embodiment may be different from the display device manufacturing apparatus 10 according to an embodiment in that the display device manufacturing apparatus 10_1 may include a movable magnetic portion IMP1 instead of the magnetic portion IMP entirely covering or overlapping the outside of the support portion SPP.

As an example, the display device manufacturing apparatus 10_1 according to an embodiment may include the movable magnetic portion IMP1 instead of the magnetic portion IMP entirely covering or overlapping the outside of the support portion SPP.

The magnetic portion IMP_1 may move at the outside of the support portion SPP while being spaced apart therefrom, in a direction from the curved conductive portion MP3 to the first flat conductive portion MP1, or from the curved conductive portion MP3 to the second flat conductive portion MP2.

For example, the magnetic portion IMP_1 may move from a portion adjacent to an uppermost end (one or an end in the second direction DR2) of the conductive portion MP to a lowermost end (the other or another end in the second direction DR2) of the conductive portion MP. The magnetic portion IMP1 may move from the portion adjacent to the uppermost end (the one or an end in the second direction DR2) of the conductive portion MP to a lowermost end of the first flat conductive portion MP1, and then may move again from the portion adjacent to the uppermost end (the one or an end in the second direction DR2) of the conductive portion MP to a lowermost end of the second flat conductive portion MP2.

In an embodiment, the number of the magnetic portions IMP_1 may be two. For example, the magnetic portions IMP_1 may move from the portion adjacent to the uppermost end (the one or an end in the second direction DR2) of the conductive portion MP to the lowermost portions of the first and second flat conductive portions MP1 and MP2, respectively.

Hereinafter, a display device manufacturing method using the display device manufacturing apparatus according to an embodiment will be described.

FIGS. 9 to 13 are schematic cross-sectional views showing the steps of a display device manufacturing method according to an embodiment.

Figure 8:
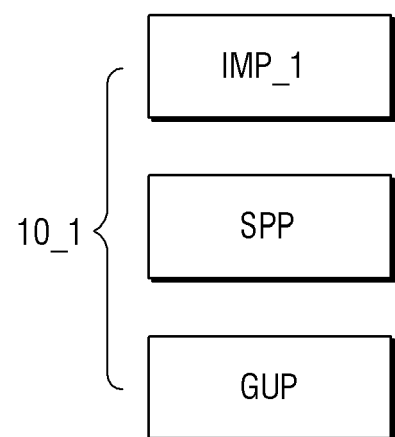
FIG. 8 is a block diagram of a display device manufacturing apparatus according to an embodiment.
Figure 9:
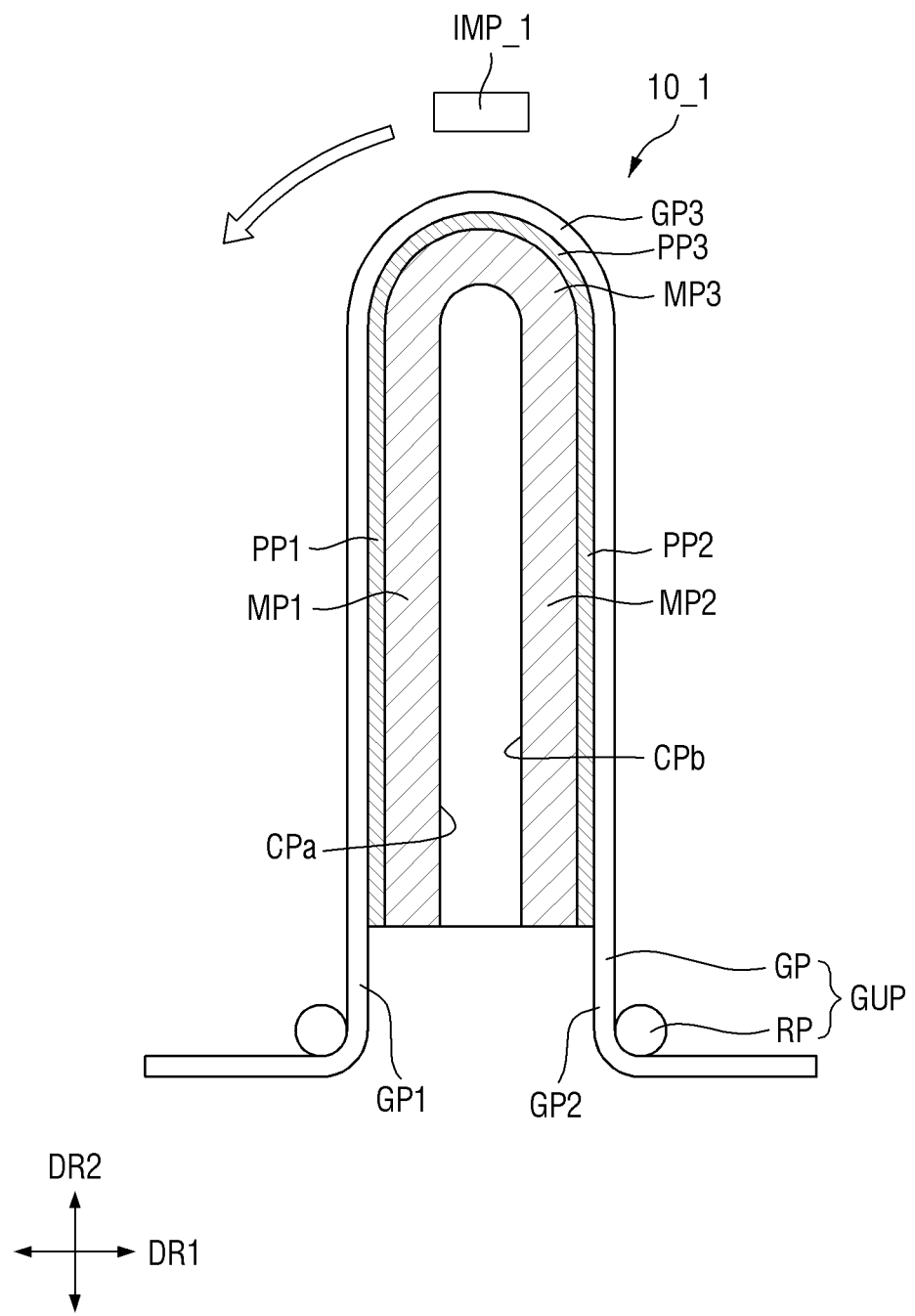
FIGS. 9 to 13 are schematic cross-sectional views showing the steps of a display device manufacturing method according to an embodiment.
Figure 10:
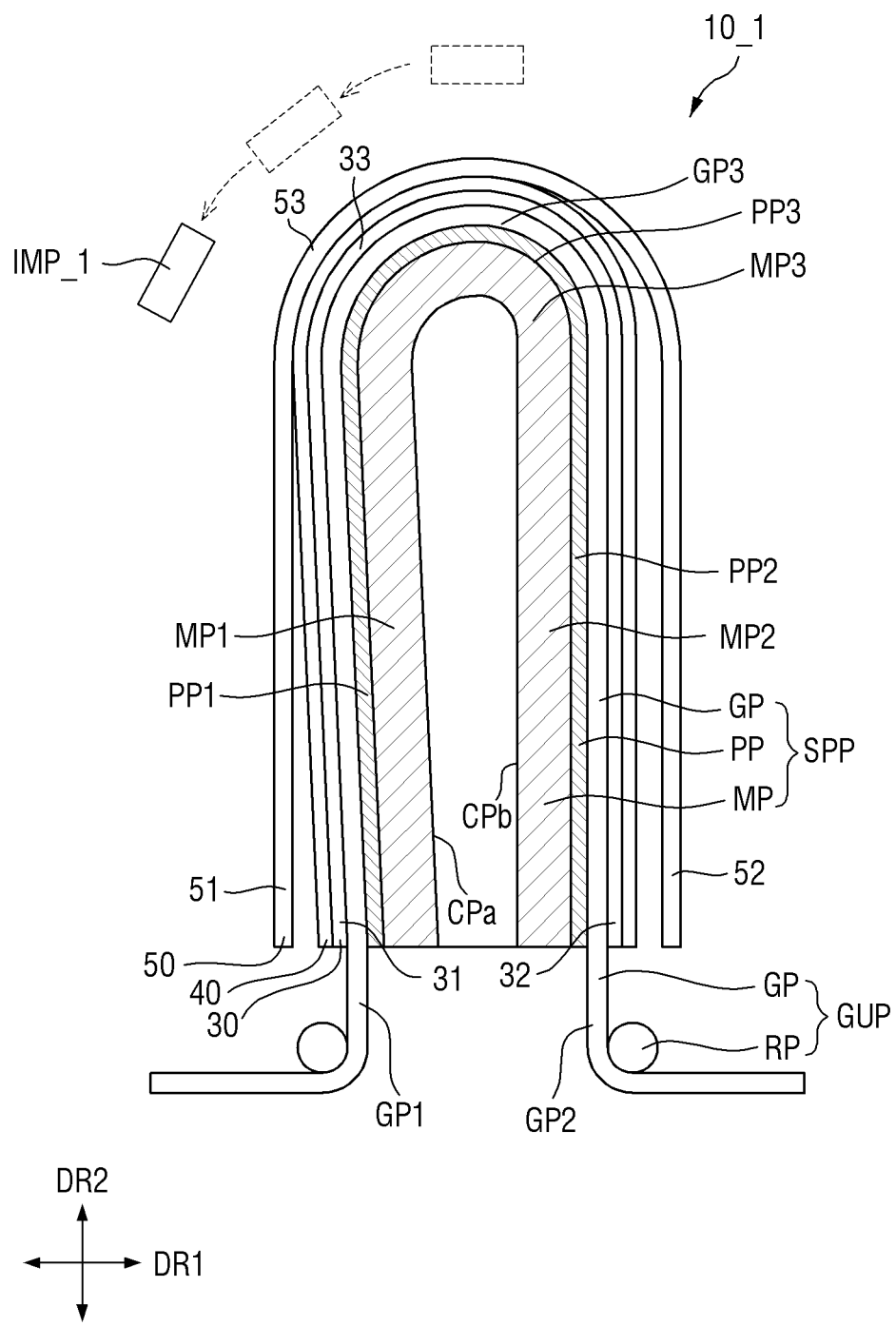
Figure 11:
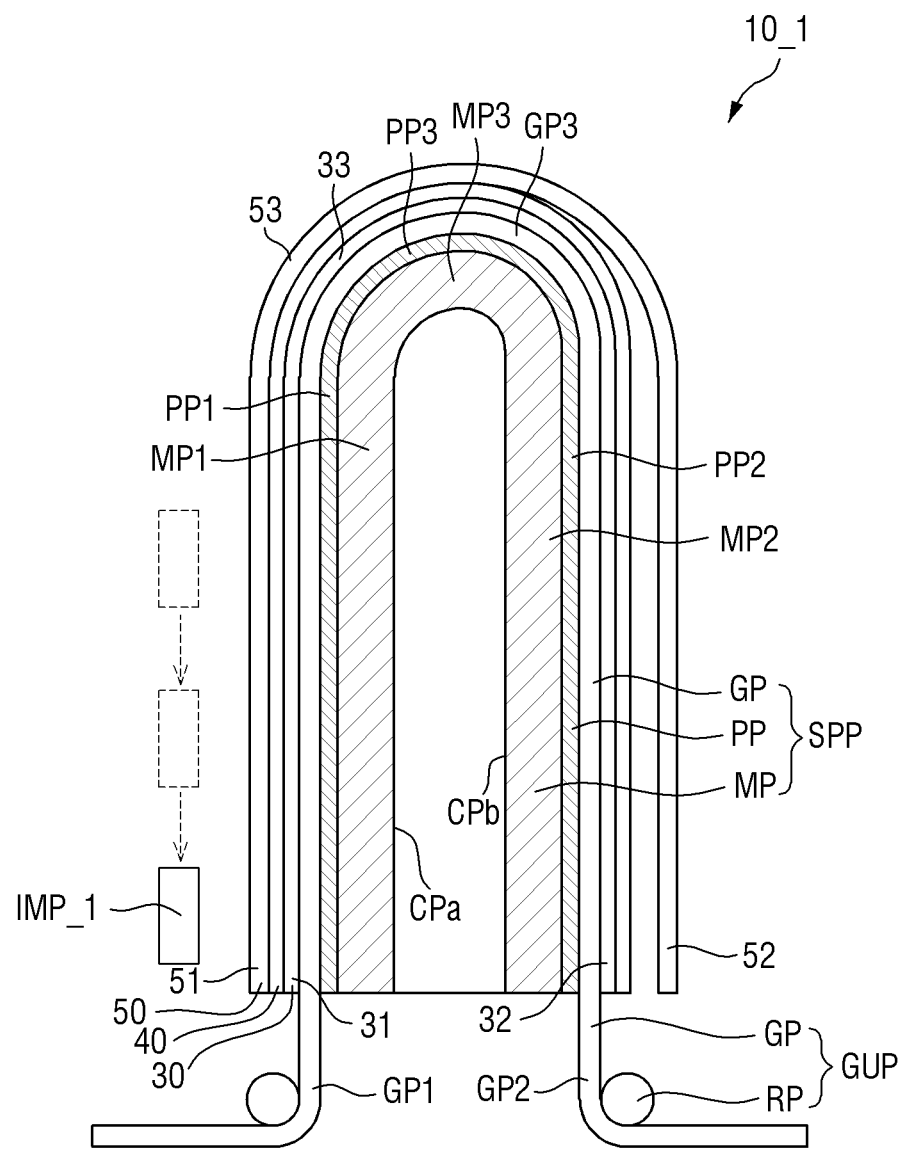

Referring to FIGS. 9 to 11, as described above with reference to FIG. 8, while the magnetic portion IMP_1 moves from the portion adjacent to the uppermost end (the one end in the second direction DR2) of the conductive portion MP to the lowermost end of the first flat conductive portion MP1, the curved panel portion 33 and the first flat panel portion 31 of the curved display panel 30 and the curved window portion 53 and the first flat window portion 51 of the curved window 50 may be coupled sequentially from the one side portions in the second direction DR2 adjacent to the uppermost ends of the curved display panel 30 and the curved window 50 to the other side portions in the second direction DR2.

Figure 12:
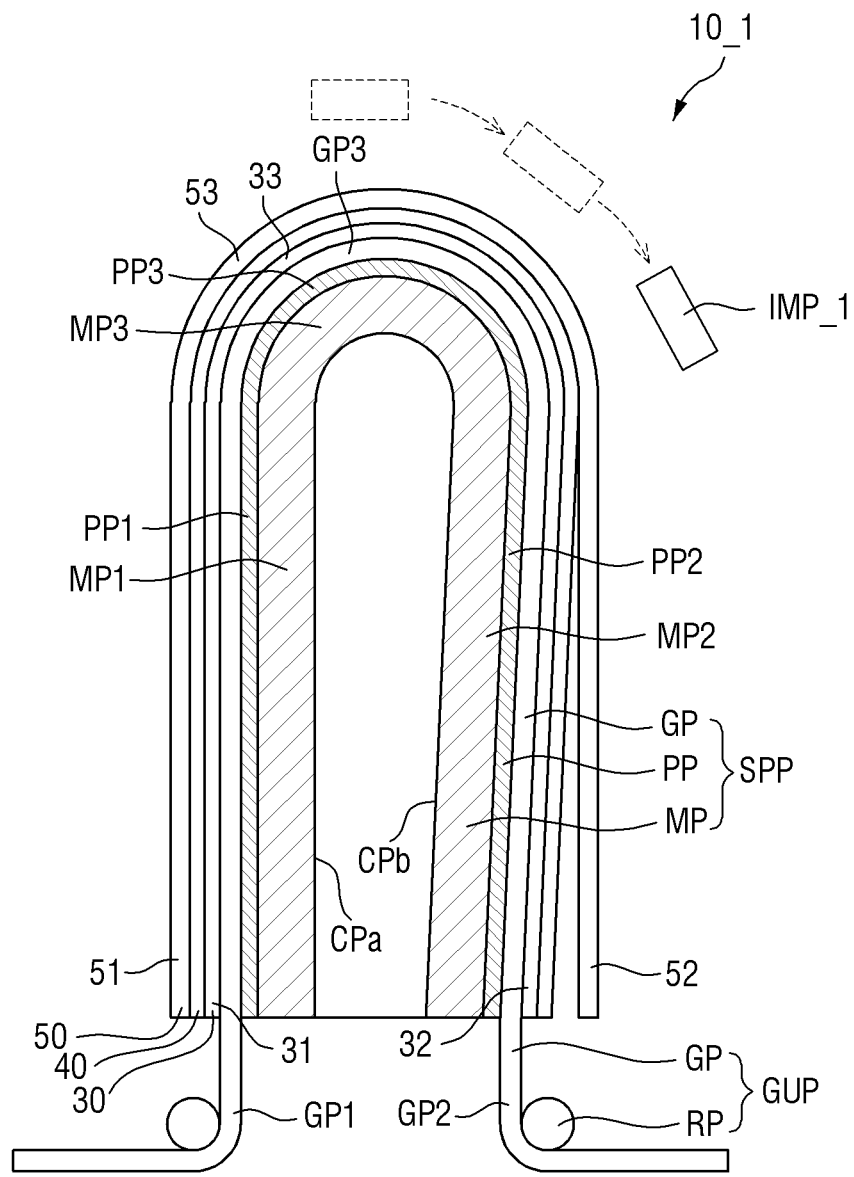
Figure 13:
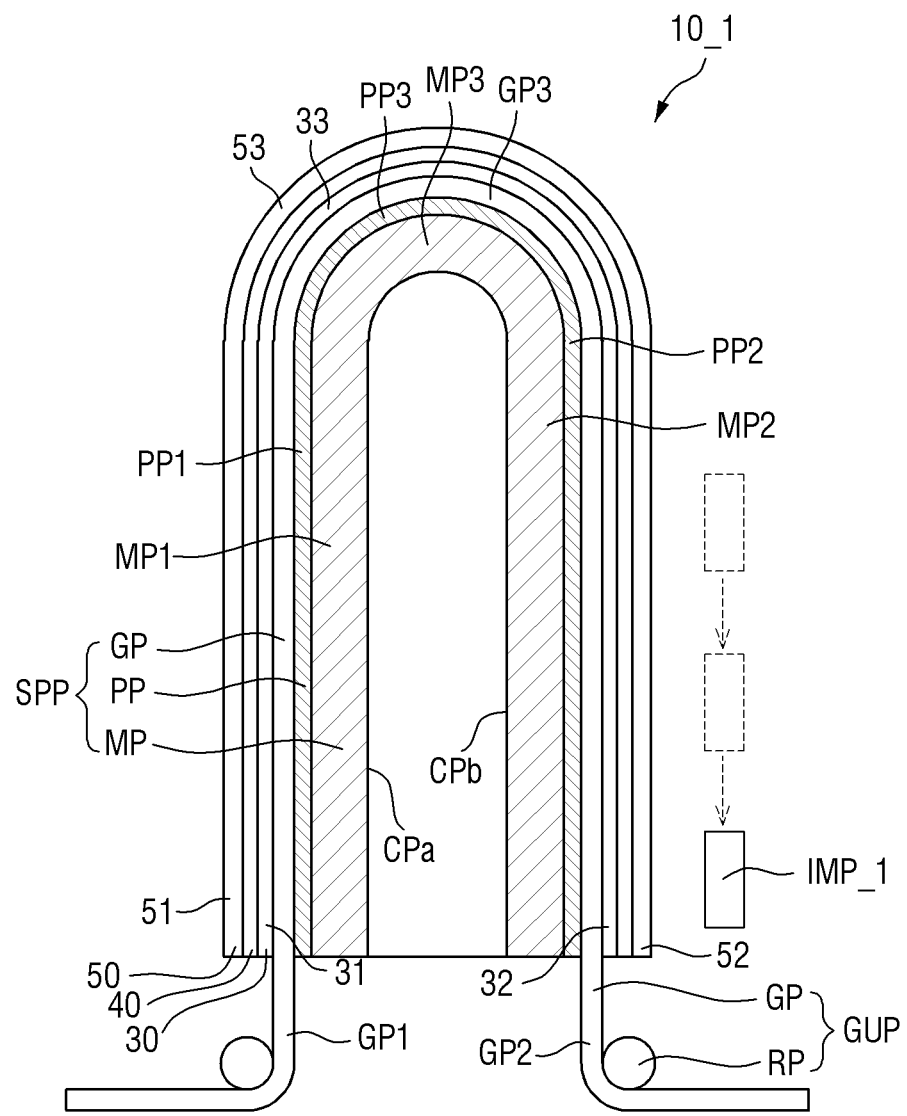

Referring to FIGS. 12 and 13, subsequently, while the magnetic portion IMP_1 moves from the portion adjacent to the uppermost end (the one or an end in the second direction DR2) of the conductive portion MP to the lowermost end of the second flat conductive portion MP2, the curved panel portion 33 and the second flat panel portion 32 of the curved display panel 30 and the curved window portion 53 and the second flat window portion 52 of the curved window 50 may be coupled sequentially from the one side portions in the second direction DR2 adjacent to the uppermost ends of the curved display panel 30 and the curved window 50 to the other side portions in the second direction DR2.

Although embodiments have been described, it is understood that the disclosure should not be limited to these embodiments but various changes and modifications may be made by one of ordinary skilled skill in the art within the spirit and scope of the disclosure as hereinafter claimed.

What is claimed is:

1. A display device manufacturing apparatus comprising:
   a support portion including a core portion and an electrically conductive portion disposed over the core portion; and
   a magnetic portion that partially surrounds the support portion, the magnetic portion capable of conducting an electric current, wherein
   the core portion includes:
      a first flat surface extending in a first direction;
      a second flat surface extending in the first direction and being opposite to the first flat surface; and
      a curved surface extending between the first flat surface and the second flat surface,
   the conductive portion includes:
      a first flat conductive portion overlapping the first flat surface of the core portion in a second direction;
      a second flat conductive portion overlapping the second flat surface of the core portion in the second direction; and
      a curved conductive portion extending between the first flat conductive portion and the second flat conductive portion, and
   in response to an electric current flowing in the magnetic portion, an electrostatic attractive force is formed between the magnetic portin and the conductive portion, causing at least one part of the magnetic portion to move towards an overlapping part of the conductive portion.

2. The display device manufacturing apparatus of claim 1, further comprising a magnetic portion disposed over the support portion, wherein the magnetic portion includes:
   a first flat magnetic portion overlapping the first flat conductive portion in the second direction;
   a second flat magnetic portion overlapping the second flat conductive portion in the second direction; and
   a curved magnetic portion extending between the first flat magnetic portion and the second flat magnetic portion.

3. The display device manufacturing apparatus of claim 2, wherein moving the magnetic portion to move towards the overlapping part of the conductive portion enables the display device manufacturing apparatus to attach a window having a curved portion to a display panel having a curved portion.

4. The display device manufacturing apparatus of claim 3, wherein the core portion is in direct contact with the conductive portion.

5. The display device manufacturing apparatus of claim 4, wherein the support portion includes a pad portion disposed over the conductive portion, wherein the pad portion includes:
   a first flat pad portion overlapping the first flat conductive portion in the second direction;
   a second flat pad portion overlapping the second flat conductive portion in the second direction; and
   a curved pad portion extending between the first flat pad portion and the second flat pad portion.

6. The display device manufacturing apparatus of claim 5, wherein the pad portion is in direct contact with the conductive portion.

7. The display device manufacturing apparatus of claim 5, further comprising a guide film portion disposed over the support portion, wherein the guide film portion includes:
   a first flat film portion overlapping the first flat conductive portion in the second direction;
   a second flat film portion overlapping the second flat conductive portion in the second direction; and a curved film portion extending between the first flat film portion and the second flat film portion.

8. The display device manufacturing apparatus of claim 7, wherein the guide film portion is in direct contact with the support portion.

9. The display device manufacturing apparatus of claim 8, wherein the first flat magnetic portion includes:

an end in contact with the curved magnetic portion; and another end opposite to the end, the first flat film portion and the second flat film portion extend in the first direction from the another end of the first flat magnetic portion, and roller portions are disposed on extended portions of the first flat film portion and the second flat film portion along the first direction from the another end of the first flat magnetic portion.

10. The display device manufacturing apparatus of claim 9, wherein the extended portions of the first flat film portion and the second flat film portion are fixed by the roller portions.

11. The display device manufacturing apparatus of claim 1, wherein in response to an electric current flowing in the magnetic portion, the magnetic portion moves at outside of the support portion in a direction from the curved conductive portion to the first flat conductive portion, or from the curved conductive portion to the second flat conductive portion.

12. The display device manufacturing apparatus of claim 11, wherein moving the magnetic portion enables the display device manufacturing apparatus to attach a window having a curved portion to a display panel having a curved portion.

13. The display device manufacturing apparatus of claim 1, wherein the magnetic portion includes a plurality of sub-magnetic portions capable of being individually operated such that the sub-magnetic portions are capable of being sequentially operated or simultaneously operated.

* * * * *